Aug. 30, 1960  S. A. SVENSSON  2,950,730

VACUUM CONTROL VALVE DEVICE

Filed Dec. 20, 1955

United States Patent Office 2,950,730
Patented Aug. 30, 1960

2,950,730

VACUUM CONTROL VALVE DEVICE

Sven Alvar Svensson, Johanneshov, near Stockholm, Sweden, assignor to Ingeniorsfirman Fliesberg AB, Stockholm, Sweden, a corporation of Sweden Filed Dec. 20, 1955, Ser. No. 554,294

Claims priority, application Sweden Dec. 23, 1954

3 Claims. (Cl. 137—116.3)

This invention relates to valve devices for controlling the vacuum in suction apparatus such as suction boxes or the like in which a predetermined vacuum shall be maintained.

Valve devices of that type usually include two valve members, namely one for controlling the flow through the evacuation conduit between a vacuum source and the apparatus to be evacuated such as a suction box, and one for allowing air to enter into the conduit connected with said apparatus with the object to decrease the negative pressure when it tends to fall below the predetermined value.

In valve devices of this type both valve members are usually regulated by a diaphragm, bellows or the like, one side of which being connected to the atmosphere while the other side is subjected to the vacuum. In hitherto known devices the valve member controlling the air intake was arranged in direct open connection with the diaphragm or the like, so that the fresh air at first entered the diaphragm housing at one side of the said diaphragm and then the conduit leading to the evacuated apparatus. Said fresh air thus flows through said diaphragm chamber but this has proved inconvenient owing to the fact that when entering into said chamber the air expands at the evacuated side of the diaphragm which results in an unstable condition so that the said diaphragm will oscillate and thereby generate variations of the pressure in said vacuum conduit and apparatus. A damping of the swinging tendency may, however, be obtained by throttling the connection with said diaphragm chamber, but said throttling may not be too great so as to permit the entered fresh air to reach the vacuum apparatus with sufficiently low pressure drop.

In a valve device according to this invention these drawbacks are eliminated by the arrangement of a permanently closed diaphragm chamber which has a throttled connection with the evacuation conduit between said valve and the vacuum apparatus, said connection being spaced from the air intake place. Owing thereto the fresh air will directly enter said conduit and the expansion of said air at the intake place will not affect the operation of the diaphragm. Suitably the connection between the evacuation conduit and said diaphragm chamber is adjustable in order to permit adjustment of the rate at which the diaphragm shall operate in different installations.

By the arrangement according to the invention it is also possible to adjust the position of the valve member relative to the diaphragm so that the latter especially at large deflections may be brought to work with substantially equal deflection at both sides of a plane through the fastening points of the diaphragm. Due to this the diaphragm is subjected to a minimal stress, whereby the life thereof will be lengthened.

In a device according to the invention the valve for throttling the passage of the evacuating conduit is suitably a double seat valve. According to the invention one of the two spaced valve seats has a conical annular surface and the other a plane annular surface. The two valve members cooperating with said seats are arranged in such a manner that the valve member cooperating with the conical seat has a plane circular engaging surface and the other valve member is conical. The plane circular valve member has such a diameter that it may be closely pushed through the opening of the plane annular seat of the valve housing. In this manner a double seat valve is obtained which may be completely balanced as both narrow circular tightening surfaces are of equal diameter. It is to be noted that said double seat valve may be used in many other connections than the above mentioned.

In the following the invention will be described in detail with reference to the accompanying drawing in which.

Figure 1:
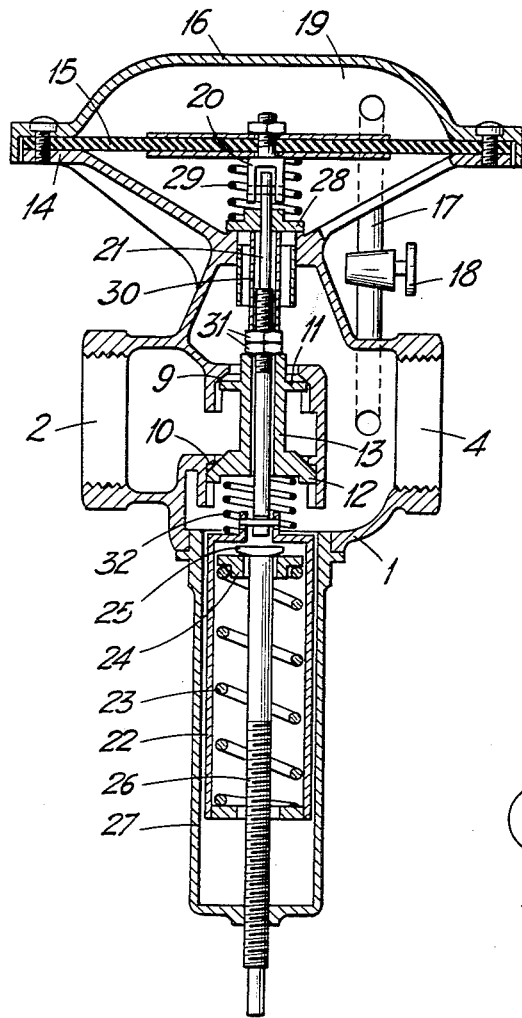
Fig. 1 is an elevational sectional view of a vacuum control valve device according to the invention.
Figure 2:
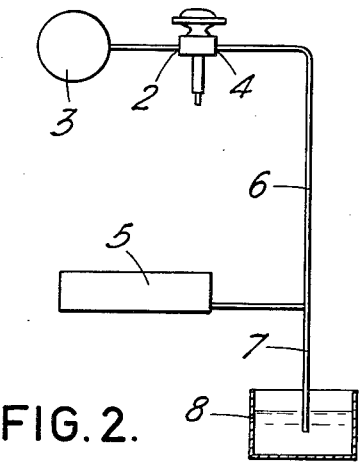
Fig. 2 is a schematical view of a vacuum control system including said valve device.

In the drawing, there is shown a valve housing having a tube fitting 2 for connection with a vacuum pump 3 and another tube fitting 4 for connection with a suction apparatus 5, for instance a suction box, which shall be evacuated. A vertical branch tube 7, communicating with the tube 6 leading from the tube fitting 4 to the suction box 5 extends down into a water receptacle 8, in order to serve as a barometric riser tube by means of which a substantially constant vacuum may be maintained. The water column in the riser tube may also take up possible condensate.

The valve housing 1 is provided with two seats 9 and 10 respectively for cooperation with two valve plates 11 and 12 respectively of a double valve member 13. At the top of the valve housing 1 a flange 14 is provided for the fastening of a pressure responsive means such as a diaphragm 15 by means of a cap 16, which is screwed to the flange 14 and holds the diaphragm tightly clamped in place. The diaphragm 15 is thus disposed in a chamber that is defined on the housing 1 and normally separated from the interior of the housing 1. The underside of the diaphragm 15 is subjected to the air through openings in the wall below said flange 14. A conduit 17 provided with a valve 18 connects the space of the valve housing that communicates with the suction apparatus to the diaphragm chamber 19 between the cap 16 and the diaphragm 15. At the centre thereof the diaphragm 15 is provided with a bracket 20, tightly secured to the diaphragm by means of washers on both sides thereof. To the bracket 20 a spindle 21 is linked, said spindle being screw threaded intermediate its ends and at its lower end hinged to a cylindrical member or cylinder or tube 22 serving as a yoke. The tube 22 includes a helical spring 23 resting with its one end against the bottom of the cylinder 22 and with its other end against a washer 24, which is secured to a spindle 26 by a head 25. The spindle 26 passes freely through an opening in the cylinder 22 and is threaded through the bottom of an outer cylindrical casing 27, which in turn is secured to the valve housing 1.

Between the fittings 2 and 4, and the flange 14 the housing 1 is reduced in section to form an air intake opening and a passage for the spindle 21. A bleed valve member 28 cooperates with a seat around said air intake opening and is slidably mounted on said spindle 21. A helical compression spring 29 surrounds the spindle 21 between said valve member 28 and the diaphragm 15, urging said valve member towards its seat. However, the movement of the valve member 28 away from the diaphragm is restricted by stud means which includes a sleeve 30 resting against two nuts 31, which are engaged on the threaded portion of the spindle 21.

The double seat valve member 13 is in similar manner slidably mounted on the spindle 21, so that this valve member may be freely moved towards the cylinder 22 against the force of a helical compression spring 32. However, this valve member 13 may not be moved in opposite direction beyond a limit determined by the nuts 31. The sleeve 30 and the nuts 31 shall have such a length or be fixed in such a position that the valve members 28 and 13 close their respective passages when both simultaneously engage the sleeve and the nuts respectively.

The device operates in the following manner. By means of the threaded spindle 26 the pressure of the spring 23 is adjusted so that at a predetermined value of the vacuum in the suction box 5 the valve members 13 and 28 are closed. Thus when the desired vacuum exists in the suction box 5 the passage through the evacuation conduit as well as the air inlet is closed. At the same time the water in the receptacle 8 is sucked up in the riser tube 7 to a height corresponding to the value of the vacuum. If the pressure in the suction box decreases the diaphragm 15 will be moved upwardly as well as its spindle 21 and the sleeve 30 while the double seat valve member 13 remains in closed position. At the same time the spring 23 is compressed. At the movement described the bleed valve member 28 resting against the sleeve 30 will also be moved upwardly and open the connection with the surrounding air. Fresh air will be bled directly through the valve housing and flow into the vacuum conduit and restore the predetermined desired negative pressure, and thereafter the bleed valve member 28 is moved back to closed position.

Under converse condition when the pressure in the suction box 5 rises the diaphragm 15 will be moved downwardly against the force of the spring 29 which maintains the valve 28 in closed position while the nuts 31 move the double seat valve member 13 out of engagement with its seat in order to bring the suction box 5 in communication with the vacuum pump 3. When the predetermined value of the vacuum is reached the diaphragm 15 and both valve members 13 and 28 take up closed positions.

The diaphragm chamber 19 may be connected with the evacuation conduit or the evacuated apparatus at any suitable point although in the drawing this connection is shown as leading from the chamber 19 to the proper valve housing 1. By means of the valve 18 in the conduit 17 the throttling may be adjusted so that a steady operation with small pressure variations is obtained.

Due to the possibility of adjusting the position of the sleeve 30 by means of the nuts 31 one may adjust the position of the diaphragm so that the deflections of the latter are substantially equal to both sides of a plane through the fastening points of the diaphragm.

It is to be noted that the double seat valve member is fully balanced due to the fact that the opposite surfaces on which the fluid pressure acts are substantially equal.

This condition is obtained by the arrangement of a circular plane valve member acting against a conical valve seat and vice versa. In this manner the circular plane valve member may be dimensioned so that it closely passes through the opening of the plane seat and the little difference of the effective areas of the both valve members that may occur is determined by the infinitesimal difference of the diameters of the valve member 11 and the opening of the seat 10.

What I claim is:

1. A valve device for maintaining vacuum in an apparatus at a constant negative pressure value comprising a valve housing having one side connected to said apparatus, first balanced valve means in said housing for controlling the passage therethrough, second valve means adapted to operate when the first valve means is closed for controlling the passage of fresh air to said one side of said valve housing, pressure responsive means for controlling both said valve means in response to the vacuum prevailing in said apparatus, and a conduit connecting said pressure responsive means with said one side of said valve housing, the opening of said conduit being located remote from said second valve means, the first and second valve means including coaxial valve members adapted to work in opposite directions, a spindle slidably supporting said valve members, stud means between said valve members for determining the distance between the same corresponding to closed position of both valve members, spring means at opposite sides of said valve members for urging the same towards each other, said pressure responsive means being connected to said spindle for operating said spindle.

2. A valve device for maintaining vacuum in an apparatus at a predetermined constant negative pressure value, comprising a valve housing having one side connected to said apparatus, suction outlet means from said housing, balanced valve means in said housing for controlling the passage therethrough and biased into closed position, bleed valve means independently movable relative to said balanced valve including means for bleeding fresh air directly through the balanced valve housing and means biasing said bleed valve into closed position, a chamber defined on said housing separated from the interior of said housing, a conduit connecting said chamber with said one side of the valve housing at a point remote from said bleed valve, common control means for said balanced valve means and said bleed valve and including means located in said chamber and being through said conduit connected to said apparatus and responsive to the negative pressure prevailing in said apparatus, said control means being actuatable for operating said balanced valve means and said bleed valve, respectively, in response to the positive and respectively negative differential between the negative pressure in the apparatus and said predetermined negative pressure value.

3. A valve device for maintaining vacuum in an apparatus at a predetermined constant negative pressure value, comprising a valve housing having one side connected to said apparatus, suction outlet means from said housing, balanced valve means for controlling the passage therethrough and biased into closed position, bleed valve means independently movable relative to said balanced valve including means for bleeding fresh air directly through the balanced valve housing and means biasing said bleed valve into closed position, movable spindle means yieldingly supporting said balanced valve means and said bleed valve and actuatable to cooperate with said balanced valve means and bleed valve, respectively, to move the same to selectively opened position, while the other is in closed position, a chamber defined on said housing separated from the interior of said housing, pressure responsive means located in said chamber and being actuatable for operating said spindle in response to the vacuum prevailing in said apparatus, and a conduit connecting said chamber with said one side of the valve housing at a point remote from said bleed valve.

References Cited in the file of this patent

UNITED STATES PATENTS

| 997,038 | Brummer | July 4, 1911 |
| 1,486,111 | Larrabee | Mar. 4, 1924 |
| 2,117,044 | Spence | May 10, 1938 |
| 2,395,941 | Rockwell | Mar. 5, 1946 |
| 2,652,847 | Segeborth | Sept. 22, 1953 |
| 2,664,095 | Mogni | Dec. 29, 1953 |
| 2,731,026 | Hughes | Jan. 17, 1956 |
| 2,745,322 | Broughton | May 15, 1956 |

FOREIGN PATENTS

| 1,034,378 | France | Apr. 8, 1953 |